(12) United States Patent
Wu et al.

(10) Patent No.: US 9,143,483 B2
(45) Date of Patent: Sep. 22, 2015

(54) METHOD FOR ANONYMOUS COMMUNICATION, METHOD FOR REGISTRATION, METHOD AND SYSTEM FOR TRANSMITTING AND RECEIVING INFORMATION

(75) Inventors: Qiang Wu, Shenzhen (CN); Bing Huang, Shenzhen (CN); Chunbo Yao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 118 days.

(21) Appl. No.: 13/501,135

(22) PCT Filed: Aug. 26, 2010

(86) PCT No.: PCT/CN2010/076378
§ 371 (c)(1),
(2), (4) Date: Apr. 10, 2012

(87) PCT Pub. No.: WO2011/041967
PCT Pub. Date: Apr. 14, 2011

(65) Prior Publication Data
US 2012/0203856 A1  Aug. 9, 2012

(30) Foreign Application Priority Data

Oct. 10, 2009 (CN) .......................... 2009 1 0205328

(51) Int. Cl.
*H04L 29/06* (2006.01)
*H04W 12/02* (2009.01)
*H04W 12/06* (2009.01)

(52) U.S. Cl.
CPC ............ *H04L 63/0407* (2013.01); *H04L 63/08* (2013.01); *H04W 12/02* (2013.01); *H04W 12/06* (2013.01)

(58) Field of Classification Search
CPC ... H04L 63/08; H04L 63/0407; H04W 12/02; H04W 12/06
See application file for complete search history.

(56) References Cited

U.S. PATENT DOCUMENTS 7,324,517 B1    1/2008  Sundaresan
8,464,334 B1 *  6/2013  Singhal ........................... 726/13
(Continued)

FOREIGN PATENT DOCUMENTS

CN    101262416 A    9/2008
CN    101400054 A    4/2009
(Continued)

OTHER PUBLICATIONS

2nd Sensor & Overlay Workshop, DPS-134-6, ID/Locator, 2008, 27 pages.
(Continued)

*Primary Examiner* — Vivek Srivastava
*Assistant Examiner* — Hien Doan
(74) *Attorney, Agent, or Firm* — Banner & Witcoff

(57) ABSTRACT

A method and a system for anonymous communication are disclosed in the present invention, which are applied in an architecture network with Identification (ID) identifier and locator separation. The method includes: after receiving an anonymous communication request initiated by a terminal, the network allocating an anonymous ID identifier to the terminal, and recording a state of the terminal as an anonymous communication state; when the terminal is in the anonymous communication state, an access gateway device where the terminal is located replacing a source access identifier in data message transmitted by the terminal with the anonymous ID identifier while receiving the data message; and replacing an anonymous ID identifier in data message transmitted to the terminal with the access identifier of the terminal while receiving the data message transmitted to the terminal.

11 Claims, 4 Drawing Sheets

(56) References Cited

U.S. PATENT DOCUMENTS

| | | | |
|---|---|---|---|
| 2002/0186698 A1* | 12/2002 | Ceniza | 370/401 |
| 2005/0141531 A1* | 6/2005 | Kinoshita et al. | 370/401 |
| 2008/0028206 A1* | 1/2008 | Sicard et al. | 713/156 |
| 2008/0195753 A1* | 8/2008 | Shimada | 709/238 |
| 2008/0244728 A1* | 10/2008 | Terasoma | 726/14 |

FOREIGN PATENT DOCUMENTS

| | | |
|---|---|---|
| JP | 2001306455 A | 2/2001 |
| JP | 2004023592 A | 1/2004 |
| JP | 2004056317 A | 2/2004 |
| JP | 2005010941 A | 1/2005 |
| JP | 2008199348 A | 8/2008 |
| JP | 2009086916 A | 4/2009 |

OTHER PUBLICATIONS

International Search Report dated Dec. 9, 2010 of PCT/CN2010/076378.

* cited by examiner

US 9,143,483 B2

METHOD FOR ANONYMOUS COMMUNICATION, METHOD FOR REGISTRATION, METHOD AND SYSTEM FOR TRANSMITTING AND RECEIVING INFORMATION

TECHNICAL FIELD

The present invention relates to the field of a communication technology, and in particular, to a method for anonymous communication and a registration method for anonymous communication as well as a method and system for transmitting and receiving information.

BACKGROUND OF THE RELATED ART

The IP address in Transmission Control Protocol/Internet Protocol (TCP/IP) widely used in the exiting Internet has dual functions, which is not only used as a location identifier of a network interface of a communication terminal host of a network layer in a network topology, but also is used as an identification (ID) identifier of the network interface of the host at a transport layer. In early period of the TCP/IP design, the condition of host mobility is not considered. However, when the host mobility is increasingly common, the defect of semantic overload of the IP address is increasingly evident. When the IP address of the host is changed, not only the route changes, but also the identification identifier of the communication terminal host changes, which will lead to an increasingly heavy routing load, and the change of the identifier of the host will cause an interruption of applications and connections. The purpose for presenting the problem of identification identifier and location separation is to solve problems such as the semantic overload of the IP address and a serious routing load etc., separate the dual functions of the IP address, support the issues such as mobility, multi home-ness, IP address dynamical re-allocation, reduction of routing load, and interactions between different network areas in the next generation Internet, and so on.

In the related art, there are mainly two solutions for ID identifier and locator separation, one is implemented based on a host, and the other is implemented based on a router. Each implementation is supported by a plurality of related technologies. An existing primary protocol based on a host is a Host Identity Protocol (HIP for short), and an existing primary protocol based on a router is Locator/ID Separation Protocol (LISP for short) and so on.

The HIP is a protocol associated with host mobility, and the HIP separates an IP address into an endpoint identifier and a location identifier. The basic idea of the HIP is to introduce a 3.5 layer, i.e., a Host Identity Layer (HIL for short), between the third layer, i.e., a network layer, and the fourth layer, i.e., a transport layer. That is, a Host Identity (HI for short) space is introduced between a domain name space and an IP address space. The HIL separates the original tightly-coupled transport layer and network layer, and the IP address no longer plays the role of identifying the host, and is only responsible for routing and forwarding data packets, that is, only be used as a locator, and a host name is represented by the host identifier. The HIL logically is located between the network layer and the transport layer. The transport layer uses a transport layer identifier, and a translation between the host identifier and the IP address in the data packet is implemented by the HIL. The network layer is shielded for the transport layer, and any change in the network layer (for example, the change of the host IP address in the communication process) does not influence a transport layer link, unless the quality of service changes.

The connection of the transport layer based on the HIP protocol is established on the host identifier, and the IP address is only used for the routing in the network layer, and is no longer used for identifying the host ID. The key idea of the HIP is to disconnect the tight coupling between the network layer and the transport layer, so that a connection between an application layer and the transport layer will not be influenced by the change of the IP address. When the IP address changes in one connection, the HI remains unchanged, thus ensuring that the connection is not interrupted. In a host supporting the HIP, the IP address is only used for routing and addressing functions, while the HI is used to identify a terminal host to which a connection corresponds, instead of an IP address used in a connection socket.

The LISP reuses the routing technology, makes some changes to the existing routing topological structure, combines with the existing transmission network, and optimizes the existing routing and transmission technologies with the minimum transformation.

The host uses an IP address, which is referred to as Endpoint Identifiers (EID) in a LISP system to keep the track of the socket, so as to establish a connection, and transmit and receive the data packets.

The router transmits the data packets based on IP destination address Routing Locators (RLOCs).

In the LISP system, tunnel routing is introduced, and the LISP is encapsulated when the host packets are initiated, and the data packets are de-encapsulated before the data packets are finally transmitted to the destination. In the LISP data packets, the IP addresses of the "outer header" are RLOCs. In a process of end-to-end packet exchange between hosts of two networks, the Ingress Tunnel Router (ITR) encapsulates a new LISP header for each packet, and strips the new header in the egress channel routing. The ITR performs an EID-to-The RLOC searching to determine a routing path to an Egress Tunnel Router (ETR), and the ETR treats the RLOC as one of its addresses.

The LISP is a network-based protocol, and only influences the network part, and more specifically, only influences the existing Internet backbone (backbone network) part, but does not influence an access layer of the existing network and the user host, and is completely transparent to the host.

In the existing solutions for ID identifier and locator separation above, the corresponding location identifier must be searched for with the user's ID identifier. The ID identifier must be the true identity of a communication node, and the ID identifier must be passed between communication nodes; otherwise, it is impossible to determine the location identifier of the communication nodes, and it is impossible to establish a contact between communication nodes.

For the consideration of security and service characteristics, a number of application services of the existing Internet network are developed in an anonymous mode, while the existing solutions for ID identifier and locator separation cannot meet the requirements for the development of the services in an anonymous mode.

SUMMARY OF THE INVENTION

The technical problem to be solved by the present invention is to provide a method for anonymous communication, and a registration method for anonymous communication, as well as a method and system for transmitting and receiving information, it is to provide an anonymous space on the basis of constructing a real-name trust domain under an architecture with ID identifier and locator separation, so as to meet the requirements for the development of services in an anonymous mode.

In order to solve the above problem, the present invention provides a method of anonymous communication, which is applied in an architecture network with identification identifier and locator separation, comprising:

after receiving an anonymous communication request initiated by a terminal, the network allocating an anonymous identification identifier to the terminal, and recording a state of the terminal as an anonymous communication state;

when the terminal is in the anonymous communication state, an access gateway device where the terminal is located replacing a source access identifier in data message with the anonymous identification identifier when receiving the data message transmitted by the terminal; and replacing an anonymous identification identifier in data message transmitted to the terminal with the access identifier of the terminal when receiving the data message transmitted to the terminal.

In the step of allocating an anonymous identification identifier to the terminal, a mapping server in the network or the access gateway device where the terminal is located allocates the anonymous identification identifier to the terminal.

The step of the access gateway device where the terminal is located allocating an anonymous identification identifier to the terminal further comprises: registering the allocated anonymous identification identifier with the mapping server.

Before the step of recording a state of the terminal as an anonymous communication state, the method further comprises:

when receiving the anonymous communication request, the access gateway device where the terminal is located initiating an authentication process to an authentication center, and recording the state of the terminal as the anonymous communication state after acknowledging that the terminal has an access to an anonymous communication service.

The method further comprises:

after receiving a request for cancelling the anonymous communication from the terminal, the access gateway device where the terminal is located changing the state of the terminal from the anonymous communication state to a normal communication state.

The method further comprises:

after the access gateway device where the terminal is located changes the state of the terminal from the anonymous communication state to a normal communication state, canceling the replacement of the anonymous identification identifier when receiving/transmitting the data message from/to the terminal.

The anonymous communication request initiated by the terminal carries time period information; and the step of the access gateway device where the terminal is located changing the state of the terminal to be an anonymous communication state when receiving the anonymous communication request further comprises:

setting an anonymous communication timer according to the time period information in the anonymous communication request; and changing the state of the terminal from the anonymous communication state to a normal communication state after the timing period of the timer is expired.

The present invention further provides a method for forwarding data message, comprising:

a source node transmitting the data message to a destination node, wherein, the data message comprises a destination address and a first source address;

when receiving the data message, a source access node replacing a first source address comprised in the data message with a second source address allocated to a terminal, and forwarding the data message to a destination access node according to the destination address; and after receiving the data message, the destination access node forwarding it to the destination node.

The method further comprises: after receiving the data message, the destination node responding with data message to the source node with the second source address being a destination address;

the destination access node forwarding the responded data message to the source access node according to the second source address; and after receiving the responded data message, the source node replacing the second source address comprised in the responded data message with the corresponding first source address to forward to the source node.

The method is applied in an architecture network with identification identifier and locator separation, and the first source address is an access identifier of the terminal The present invention further provides a registration method of anonymous communication, which is applied in an architecture network with identification identifier and locator separation at least comprising a first node, an authentication center, a first access node and a first allocation node, wherein, the first node is allocated with an actual identification identifier, and the method comprises:

the first node transmitting an anonymous communication request to the authentication center via the first access node;

the authentication center receiving the anonymous communication request and determining whether the first node has an access to anonymous communication; and in the condition that the first node has an access to anonymous communication, the first access node transmitting an identification identifier allocation request to the first allocation node, and the first allocation node allocating an anonymous identification identifier to the first node and storing a corresponding relationship between the anonymous identification identifier of the first node and the actual identification identifier of the first node, or a corresponding relationship between the anonymous identification identifier of the first node and the actual identification identifier and a location identifier of the first node.

The method further comprises the first allocation node recording that the first node is in an anonymous communication state, and transmitting the anonymous identification identifier to the first access node.

The method further comprises:

the anonymous request comprising time period information; and when receiving the anonymous request, the first access node setting an anonymous communication timer according to the time period information; and changing the state of the terminal from the anonymous communication state to a normal communication state after the timing period of the timer is expired.

The anonymous identification identifier is selected from a predetermined group of identifiers for the anonymous identification identifier, or is selected from a predetermined group.

The present invention further provides another registration method of anonymous communication, which is applied in an architecture network with identification identifier and locator separation at least comprising a first node, a first access node, and a first storage node, wherein, the first node is allocated with an actual identification identifier, and the method comprises:

the first node transmitting an anonymous communication request to an authentication center via the first access node;

the authentication center receiving the anonymous communication request and determining whether the first node has an access to anonymous communication; and in the condition that the first node has an access to anonymous communication, the first access node allocating an anonymous identification identifier to the first node, and at the same time registering a corresponding relationship between the anonymous identification identifier of the first node and the actual identification identifier of the first node, or a corresponding relationship between the anonymous identification identifier of the first node and the actual identification identifier and a location identifier of the first node, with the first storage node.

The method further comprises the first access node recording that the first node is in an anonymous communication state.

The method further comprises:

the anonymous request comprising time period information; and when receiving the anonymous request, the first access node setting an anonymous communication timer according to the time period information; and changing the state of the terminal from the anonymous communication state to a normal communication state after the timing period of the timer is expired.

The present invention further provides a method for transmitting information, comprising:

a first node transmitting information to a second node via a first access node to which the first node belongs, wherein, the information at least comprises a first identifier of the first node and a first identifier of the second node; and after replacing the first identifier of the first node with an updated first identifier of the first node, the first access node to which the first node belongs encapsulating the updated first identifier of the first node and the first identifier of the second node by using the second identifier of the first node and the second identifier of the second node, and transmitting the encapsulated identifiers to a second access node to which the second node belongs, and transmitting the information obtained after being de-encapsulated via the second access node to which the second node belongs to the second node.

The first identifier is an identification identifier, the second identifier is a location identifier, the updated first identifier of the first node and/or the second identifier of the first node and the second identifier of the second node are obtained locally by the first access node, or are obtained by another node except the first access node.

The method further comprises a step of determining whether the transmitting of the information triggers a replacing process when the first access node receives the information.

The present invention further provides a system for receiving and transmitting information, which is applied in an architecture network with identification and locator separation, comprising:

a receiving unit, configured to receive information transmitted by a first node to a second node, wherein, the information at least comprises identification identifiers of the first node and the second node;

an updating unit, configured to update the identification identifier of the first node to be an anonymous identification identifier; and an encapsulating unit, configured to encapsulate location identifiers of the first node and the second node outside the anonymous identification identifier and the identification identifier of the second node, for the architecture network with identification and locator separation to implement routing and forwarding, so as to transmit the information to the second node;

wherein the receiving unit is further configured to update the anonymous identification identifier to be the identification identifier of the first node when receiving the information transmitted by the second node to the first node, and forward the information to the first node.

The present invention further provides another system for receiving and transmitting information, which is applied in an architecture network with identification an locator separation, comprising a first system and a second system, wherein, the first system comprises:
  a first receiving and transmitting unit, configured to receive first information transmitted by a first node to a second node, wherein, the first information comprises identification identifiers of the first node and the second node; receive second information transmitted by a second receiving and transmitting unit of the second system, wherein, the second information comprises an anonymous identification identifier of the first node and an identification identifier of the second node; and
  a first replacing unit, configured to update the identification identifier of the first node to be an anonymous identification identifier when the first node transmits the first information to the second node; and update the anonymous identification identifier to be the identification identifier of the first node when the second node transmits the second information to the first node;

the second system comprises:
  the second receiving and transmitting unit, configured to receive the first information and forward the first information to the first node; forward the second information from the second node to the first node, wherein, the second information comprises anonymous identification identifier of the first node and the identification identifier of the second node.

The anonymous identification identifier of the first node is used to identify a transmitting party of the information and the identification identifier of the second node is used to identify a receiving party of the information when the first node transmits the first information to the second node, and the anonymous identification identifier of the first node is used to identify a receiving party of the information and the identification identifier of the second node is used to identify a transmitting party of the information when the second node transmits the second information to the first node.

Compared with the related art, the above implementation scheme at least comprises the following beneficial effects: a solution for anonymous communication under the architecture with ID identifier and locator separation is provided, which can provide an anonymous space on the basis of constructing a real-name trust domain, so as to meet the requirements for the development of anonymous services. Under the architecture with ID identifier and locator separation, the real-name trust domain is ensured by the network credit, and in the anonymous space, the services are developed by the network according to service authentication.

PREFERRED EMBODIMENTS OF THE PRESENT INVENTION

The core idea of the present invention is that under the architecture with ID identifier and locator separation, an access gateway device and/or a mapping server allocates an AID for an anonymous identification identifier to a user terminal starting an anonymous service, and replace a real AID of the user with the AID when forwarding data message, so as to implement anonymous communication with a Correspondent Node (CN).

The present invention will be further described in detail in conjunction with accompanying drawings and specific embodiments hereinafter.

Figure 1:
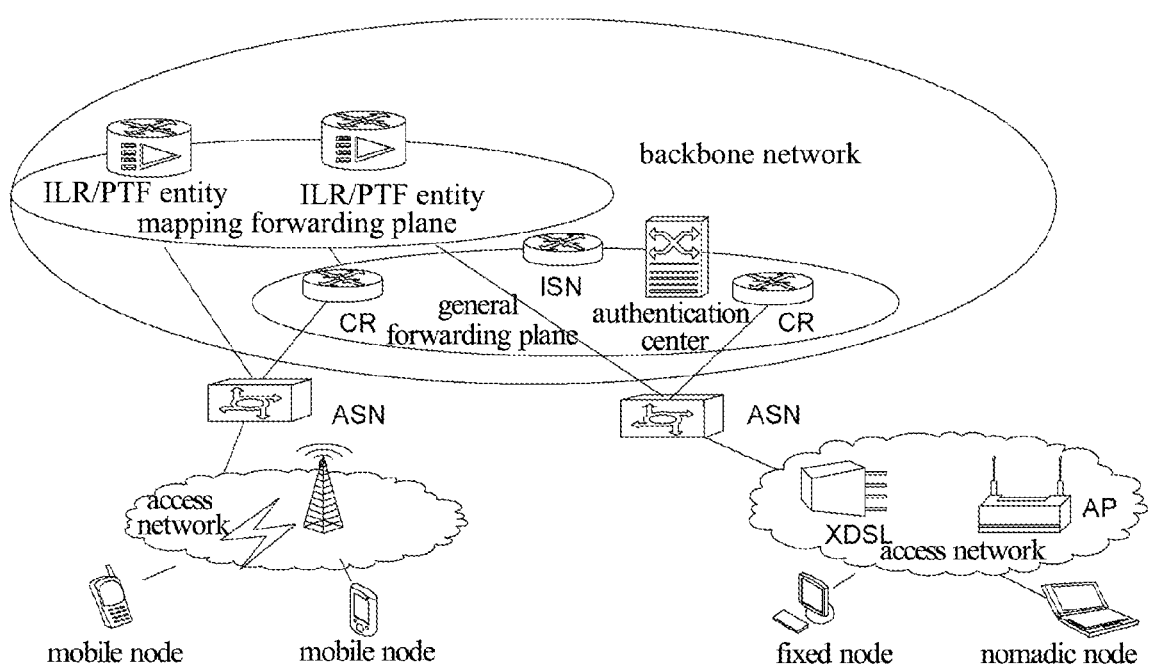
FIG. 1 is a diagram of a network topology based on an architecture with ID/Locator separation.

There are a number of network-based architectures with ID identifier and locator separation. FIG. 1 is a diagram of a network topology of the architecture with ID identifier and locator separation according to an embodiment of the present invention, wherein, key network elements/functional entities of the system architecture related to the present invention are illustrated.

As shown in FIG. 1, in the ID/Locator separation based architecture described in the present embodiment (referred to as the present architecture hereinafter), the network is divided into an access network and a backbone network, the access network is located at the edge of the backbone network, and is responsible for the accesses of all terminals. The backbone network is responsible for the routing of different terminals which access via the access network. The Access Service Node (ASN for short) is located at a boundary point of the backbone network and the access network, and interfaces with the access network and the backbone network. The ASN is used to provide access services for the terminals, maintain a user connection and forward user data and so on. The access network and the backbone network do not overlap in the topology relationship.

There are two kinds of identifiers in the present architecture network, i.e., an Access Identifier (AID for short) and a Routing-Location Identifier (RID for short). Wherein, the AID is a unique AID allocated to each user terminal in the network, is used in the access layer, and always remains the same when the user terminal moves. The AID is used to identify an opposite end between user terminals within the present architecture network, the user terminals can communicate by only using the AID of the opposite end.

With respect to FIG. 1, in a preferable embodiment, the backbone network is divided into two planes when constructing a network, i.e., a mapping forwarding plane and a general forwarding plane.

The primary function of the general forwarding plane is to route and forward data message according to the RID in the data message. The routing and forwarding actions within the general forwarding plane are the same as those in a traditional IP network.

The primary function of the mapping forwarding plane is to store mapping information between the identification and the location (i.e., RID-AID mapping information) of a mobile node, deal with a registration procedure of the mobile node, deal with a location inquiring procedure of the correspondent node, and route and forward data message treating the AID as a destination address.

With respect to FIG. 1, in the network-based architecture with ID identifier and locator separation according to the present embodiment, the involved primary network elements and functional entities are as follows:

a user terminal, in the present architecture, the accessed user terminal can be one or more of a mobile node, a fixed node and a nomadic node;

an access network, which is used to provide access service of 2 layers (a physical layer and a link layer) to the user terminal, wherein the access network can be a base station system, such as a Base Station Subsystem (BSS), a Radio Access Network (RAN), an evolved Node B (eNodeB) and so on, or can also be a Digital Subscriber Line (xDSL), a wireless Access Point (AP) and so on;

an ASN, which maintains a connection relationship between a terminal and a backbone network, allocates a RID to the terminal, deals with a handover procedure, deals with a registration procedure, performs accounting/authentication, maintains/inquires AID-RID mapping relationship information of the correspondent node, and encapsulates, routes and forwards data message transmitted to or transmitted by the terminal.

After receiving the data message transmitted by the terminal, the ASN searches for the corresponding RID thereof locally according to the AID of the CN in the message, and if the corresponding AID-RID mapping entry is found, the ASN forwards the data message to the backbone network by means of replacing the AID with the RID or by means of encapsulating the RID in the data message; and if the corresponding AID-RID mapping entry is not found, the ASN initiates an inquiry procedure to the ILR to obtain the AID-RID mapping information, and then forwards the data message by means of replacing the AID with the RID or by means of encapsulating the RID in the data message; or forwards the data message to the backbone for routing and forwarding while transmitting an inquiry to the ILR, and stores the AID-RID mapping of the CN locally after receiving the AID-RDI mapping relationship of the CN returned by the ILR.

After receiving the data message transmitted by the network to the terminal, the ASN strips the outer RID encapsulation to transmitt to the terminal.

A Common Router (CR), which routes and forwards the data message treating the RID format as source addresses/destination addresses.

An authentication center, which is responsible for recording user attributes including information such as user types, authentication information and user service levels etc. in the present architecture network, generating user security information for authentication, integrity protection and encryption, and performing legality authentication and authorization when the user accesses. The authentication center supports bidirectional authentication between the present architecture network and the user.

An Identity Location Register/Packet Transfer Function ((ILR/PTF) entity, which can be two functional modules on the same entity, and is located in the mapping forwarding plane of the backbone network.

The ILR is responsible for maintaining/storing the AID-RID mapping information relationship of users in the network-based architecture with ID identifier and locator separation, implementing the registration function, and dealing with the location inquiring procedure of the CN. Specifically, when a Mobile Node (MN for short) starts up or its location changes, a registration process is initiated to the ILR through the ASN where the MN is located, thus storing a real-time AID-RID mapping relationship of the MN in the ILR.

After the PTF entity receives the data message transmitted by the ASN, the PTF entity routes and forwards the data message according to the destination AID. After the PTF entity node in the mapping forwarding plane finds the destination AID-RID mapping relationship, the PTF entity node encapsulates the searched RID information in the data message header and forwards it to the general forwarding plane to route it to the ASN where the CN is located.

In the above architecture, the AID of the terminal during an effective legal period of existence remains always unchanged. The RID indicates the location of the ASN where the terminal is located currently. According to service requirements, the ASN can allocate one or more dedicated RIDs to the terminal and registers it with the ILR/PTF entity in the mapping forwarding plane. The ASN can also allocate the same RID to a plurality of terminals. When the terminal accesses the network, the authenticity of the user ID is guaranteed through the authentication of the authentication center, and the ILR stores the AID-to-RID mapping information of each access terminal. The Access network part uses the AID to distinguish different terminals, and the general exchange plane uses the RID to route the data message. The process of establishing end-to-end communication needs to search for corresponding RID through the AID. In the process of the end-to-end communication, the AID of the present end needs to be used as a source address and be carried in the data message to the CN. The CN can obtain the source ID from the source address carried in the data message.

The present architecture network ensures a true and reliable user ID by the network credit through the authentication of the user ID, and establishes a trust domain in the network. The authentication method for the user ID by the network can use different ways according to different network mechanisms, and can directly authenticate the AID of the user. Other types of user identification (for example, International Mobile Subscriber Identification Number (IMSI), Network Access Identifier (NAI) etc.) for identifying users in the network can also be authenticated, and the network device will store a corresponding relationship between the user identification and the AID.

The RAN part of existing access network can ensure security of 2 layer connection, and ensure that the data message will not be tampered when the terminal access the network. For example, Code Division Multiple Access (CDMA) radio access uses a code division multiple access mode, an Asymmetric Digital Subscriber Line (ADSL) uses a special line or a VLAN isolation mode, and the GSM uses a frequency division multiple access mode. All terminals are effective legal users which pass the authentication. When the terminal accesses the network, a point-to-point connection relationship will be established between the terminal and the ASN of the network. The ASN binds the AID of the terminal onto the end-to-end user connection between the terminal and the ASN. If a source address of the message transmitted on the user connection does not match the AID of the user, the ASN will discard the data message, thus to ensure that the AID of the terminal in the present architecture will not be counterfeited and changed.

The ASN and a communication device such as ILR/PTF, CR, authentication center etc. between a source ASN and a destination ASN are provided by the network operation and the management party. The security of the data message transmission is guaranteed by the network credit, so as to ensure that the data message is true and reliable.

Thus, the ID/Locator separation based architecture can construct a trust domain by the network credit in the network, and ensure that the IDs of two ends performing data communication are true and reliable.

For the consideration of security and service characteristics, a number of application services of the existing Internet network are developed in an anonymous mode. Thus, it is needed to provide an anonymous space in the trust domain which is guaranteed by the network credit, so as to meet the requirements for the development of services.

The specific implementation schemes for how to provide an anonymous space according to the present invention will be described in detail in conjunction with a number of embodiments under the above architecture with ID identifier and locator separation hereinafter. In the present embodiment, it is illustrated by taking a network-based architecture with ID identifier and locator separation; however, the architecture network on which the technical scheme of the present invention is based can also be based on the LISP and a number of other architectures with ID identifier and locator separation.

Embodiment One

Figure 2:
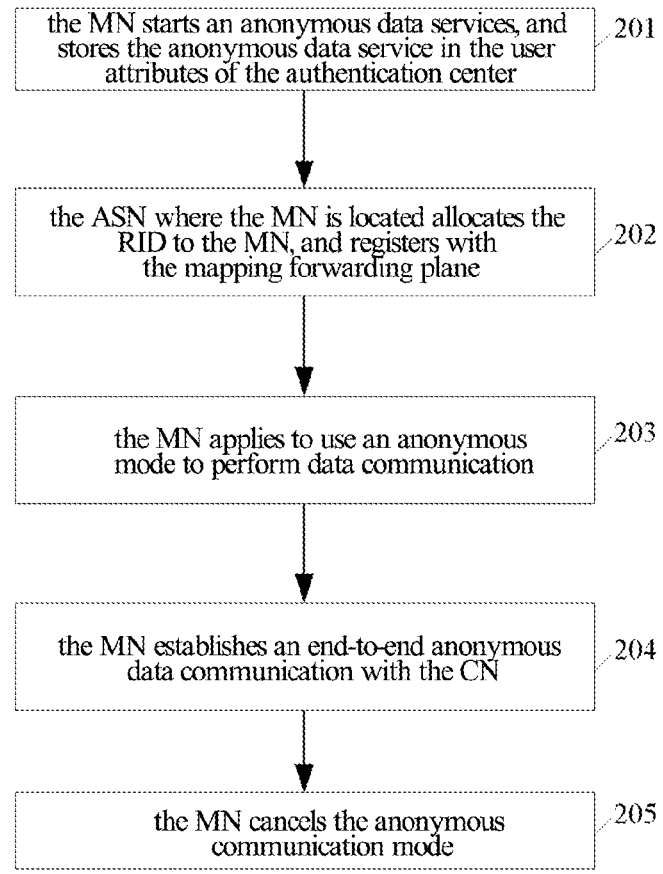
FIG. 2 is a process of an anonymous communication according to an embodiment of the present invention.

Under the architecture with ID identifier and locator separation, a real-name trust domain is guaranteed by the network credit, and the anonymous space is developed by the network according to the set service authentication. As shown in FIG. 2, the specific implementation process is as follows.

In step 201, the MN initiates a login request to request to access the present architecture network, the authentication center performs legality authentication and authorization on the MN, records user attributes, and the MN stores the anonymous data services in the user attributes if anonymous data services are opened in the present architecture network.

Figure 3:
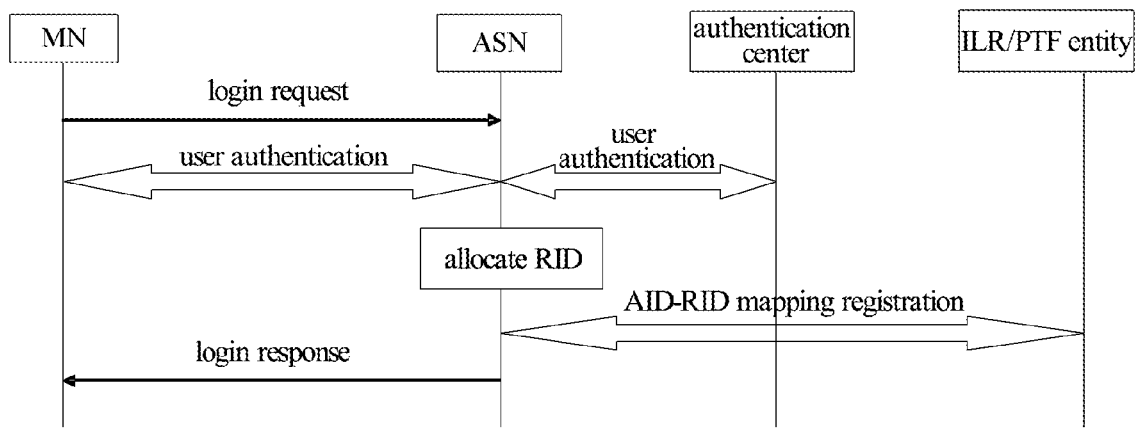
FIG. 3 is a process of login and access of a terminal user.

The process of the MN accessing the present architecture network is shown in FIG. 3, wherein, the legality authentication and authorization etc. on the MN can use the existing processes, and the bidirectional authentication is supported in the present architecture network, i.e., the MN can further perform authentication on the legality of the network.

In step 202, the MN accesses the present architecture network, the ASN where the MN is located allocates the RID to the MN, and registers a mapping relationship with the home ILR, and the ILR stores the AID-RID mapping information of the MN.

In step 203, the MN applies to use an anonymous mode for the data communication.

Figure 4:
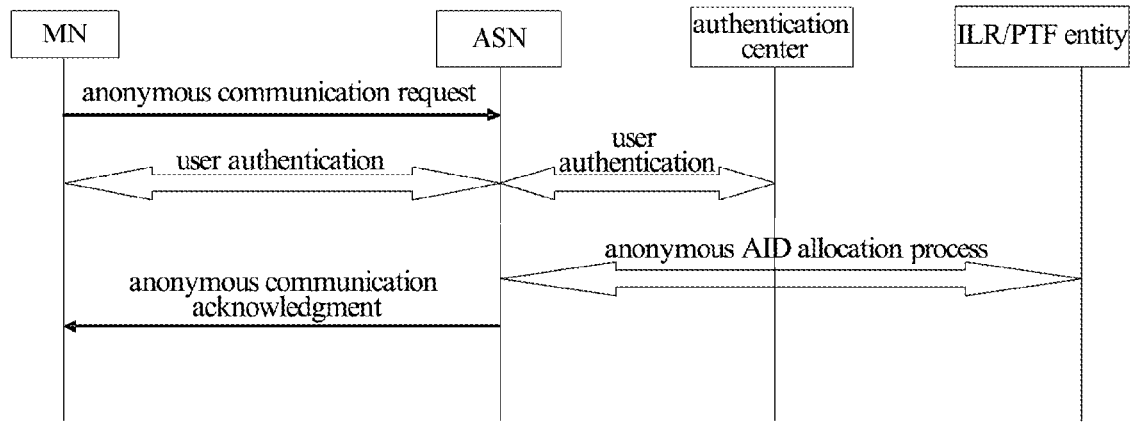
FIG. 4 is a signaling process of a terminal user initiating anonymous communication according to the embodiment one of the present invention.

FIG. 4 illustrates a diagram of a process of a terminal user initiating an anonymous communication, which specifically comprises the following steps:

the MN initiates an anonymous communication request to the ASN where the MN is located;

after acknowledging that the MN has an access to the anonymous communication service, the authentication center sends an acknowledgement to the ASN (the step is an optional step according to the operation requirements).

The ASN where the MN is located initiates an anonymous AID allocation request to the host ILR, and after receiving the request message, the host ILR records the state of the MN as an anonymous communication state, and allocates a new AID to the MN as an anonymous AID, and the host ILR can select an idle AID from a number field dedicated to anonymous AIDs or can select an idle AID from a number field; and stores the anonymous AID in the record of the MN which is stored in the host ILR, for example, recording a corresponding relationship, i.e., AID-anonymous AID-RID.

The host ILR transmits anonymous communication response message to the ASN, carries anonymous AID information, for example, a corresponding relationship of AID-anonymous AID, and after receiving the message, the ASN reads the anonymous AID information from the message, stores the anonymous AID information in a data area to which the MN corresponds, and records the state of the MN as an anonymous communication state, and during the anonymous communication state, the MN communicates with all correspondent nodes thereof using an anonymous mode.

The ASN initiates an anonymous communication acknowledge message to the MN.

In step 204, the MN establishes an end-to-end anonymous data communication with the CN.

Figure 5:
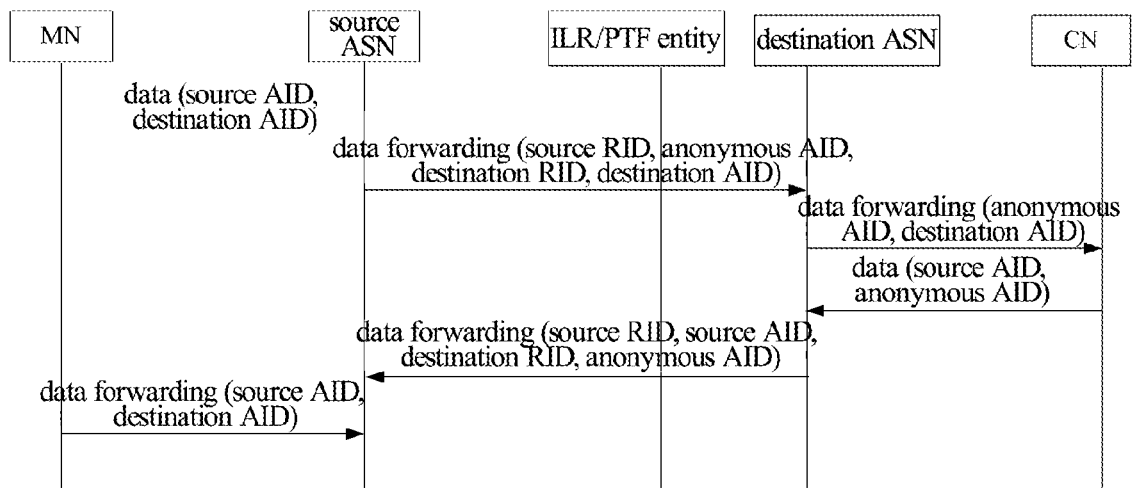
FIG. 5 is a process of establishing an end-to-end anonymous communication according to the embodiment one of the present invention.

As shown in FIG. 5, the process of the MN establishing an end-to-end anonymous communication with the CN is as follows.

The MN establishes an end-to-end communication with the CN, and on an interface between the MN and the source ASN, a format for receiving and transmitting data message is (source AID, destination AID), i.e., the source address and the destination address are ID identifiers of both parties respectively. After determining that the anonymous data service of the user is effective, the ASN where the MN is located replaces the source AID in the transmitted data message with the anonymous AID, and searches for the corresponding source RID/destination RID, and encapsulates the corresponding source RID/destination RID in the data message, and transmits it to the ASN where the CN is located through the backbone network.

Wherein, the format of the data message transmitted on the interface between the source ASN and the destination ASN is (source RID, anonymous AID, destination RID, destination AID).

After receiving the data message, the destination ASN where the CN is located strips the RID encapsulation, transmits the data message to the CN, and the format of the data message is (anonymous AID, destination AID).

The ASN where the CN is located receives the data message responded by the CN, and the format of the data message is (source AID, anonymous AID), i.e., the source address is an AID of the CN, and the anonymous address is an anonymous AID.

The ASN where the CN is located adds RID encapsulation in the data message, and the format of the encapsulated data message is (source RID, source AID, destination RID, anonymous AID), and transmits the data message to the ASN where the MN is located through the backbone network.

After receiving the data message transmitted by the CN, the ASN where the MN is located strips the RID encapsulation, and replaces the anonymous AID in the data message with the AID of the MN, and transmits the data message to the MN.

It can be seen from the above process that during the communication between the MN and the CN, the AID of the MN seen by the CN is an anonymous AID instead of an access AID.

In step 205, the NN cancels the anonymous communication mode.

Figure 6:
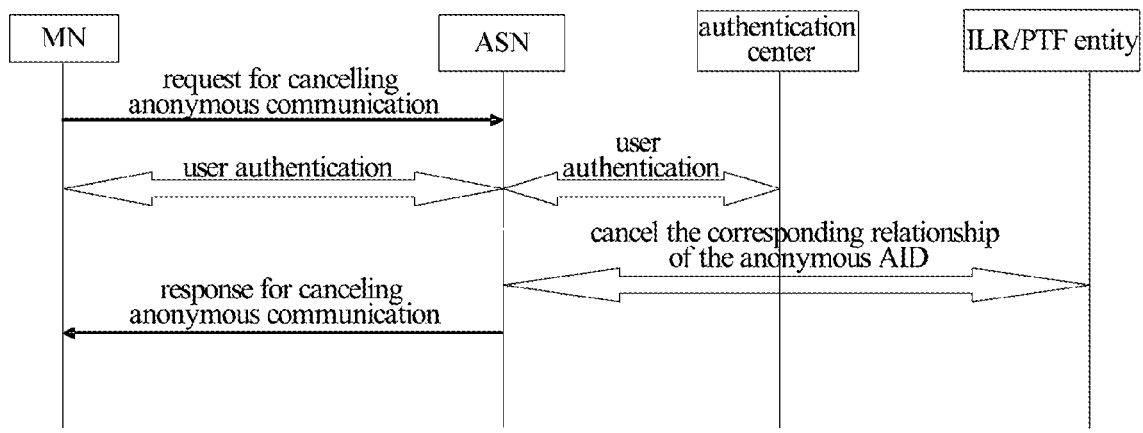
FIG. 6 is a signaling process of a terminal user canceling an anonymous communication according to the embodiment one of the present invention.

FIG. 6 is a flowchart of a terminal user canceling anonymous communication, and the specific process is as follows.

The NN initiates a request for cancelling an anonymous data communication.

After acknowledging that the MN has an access to the anonymous communication service, the authentication center sends an acknowledgement to the ASN (this step is an optional step according to the operation requirements).

The ASN deletes the corresponding relationship of the AID-anonymous AID in the data area of the MN, and changes the anonymous communication state of the MN to a normal communication state.

The ASN initiates a process of canceling the corresponding relationship of the anonymous AID to the host ILR, and the ILR deletes the corresponding relationship of the AID-anonymous AID-RID of the MN, stores the AID-RDI mapping relationship of the MN, changes the anonymous communication state of the MN to a normal communication state, and transmits response message for cancelling the anonymous communication to the ASN.

The ASN transmits the response message for cancelling the anonymous communication to the MN.

The subsequent ASNs will no longer performs the replacement between the AID and the anonymous AID when receiving and transmitting the data message of the MN.

Embodiment Two

Figure 7:
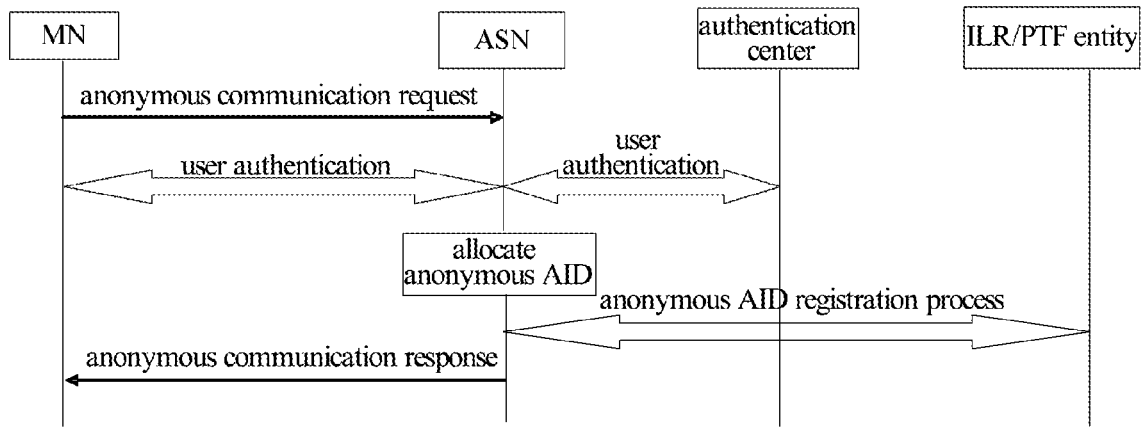
FIG. 7 is a signaling process of a terminal user initiating anonymous communication according to the embodiment two of the present invention.

The process of the present embodiment is the basically the same as that of embodiment one, and the primary difference of the two embodiments is that, in the present embodiment, as a step of replacing the above anonymous AID allocation process, as shown in FIG. 7, the anonymous AID allocation process can also be implemented by the ASN itself according to the following process.

The MN initiates an anonymous communication request through the ASN where the MN is located.

After acknowledging that the MN has an access to the anonymous communication service, the authentication center sends an acknowledgement to the ASN (this step is an optional step according to the operation requirements).

After the ASN where the MN is located receives the acknowledgement for authencating an access to anonymous service of the authentication center, the ASN allocates an anonymous AID to the MN, stores the anonymous AID in the data area to which the MN corresponds, and records the state of the MN as an anonymous communication state.

The ASN initiates an anonymous AID registration process to the host ILR, and the host ILR stores the corresponding relationship of the AID-anonymous AID-RID of the MN, and records the state of the MN as an anonymous communication state.

Here, after the host ILR stores the corresponding relationship of the anonymous AID, the subsequent CNs can inquires the RID of the MN according to the anonymous AID of the MN when transmitting data message to the MN.

The ASN transmits an anonymous communication acknowledgement message to the MN.

In the process of the subsequent MNs performing data communication, if the ASN determines that the MN is in an anonymous communication state, the ASN will be responsible for performing replacement between the AID and the anonymous AID when receiving and transmitting the data message of the MN.

Embodiment Three

The process of the present embodiment is the basically the same as that of the above embodiments, and the primary difference thereof is that, in the above embodiments, the MN applies an anonymous communication mode by initiating an anonymous communication request, and when subsequently the anonymous communication mode needs to be canceled, the MN cancels the anonymous communication mode by initiating a request for cancelling the anonymous communication.

While in the present embodiment (not shown), when the MN applies an anonymous communication mode, the initiated anonymous communication request carries time period information, which represents that the MN is in an anonymous communication state in this time period. After receiving the anonymous communication request, the ASN sets an anonymous communication timer, and before the anonymous communication timer expires, the ASN enters into the anonymous communication process as described in the above-mentioned embodiments.

In the present embodiment, the MN does not need to initiate a process to cancel the anonymous communication, and the present communication of the anonymous mode can be canceled when the anonymous communication timer expires, and the anonymous communication state of MN is changed to a normal communication state.

It can be known from the above description that, the present invention provides a method of anonymous communication under the architecture with identification identifier and locator separation. Based on the method of anonymous communication under the architecture with identification identifier and locator separation according to the present invention, an anonymous space can be provided on the basis of constructing a real-name trust domain, so as to meet requirements for developing the services. Under the architecture with identification identifier and locator separation, the real-name trust domain is ensured by the network credit, and in the anonymous space, the services are developed by the network according to service authentication.

The embodiment of the present invention provides a method for forwarding data message, comprising:

a source node transmitting the data message to a destination node, wherein, the data message comprises a destination address and a first source address;

when receiving the data message, a source access node replacing a first source address comprised in the data message with a second source address allocated to a terminal, and forwarding the data message to a destination access node according to the destination address; and after receiving the data message, the destination access node forwarding it to the destination node;

further, after receiving the data message, the destination node responding with data message to the source node with the second source address being a destination address;

the destination access node forwarding the responded data message to the source access node according to the second source address; and after receiving the responded data message, the source node replacing the second source address comprised in the responded data message with the corresponding first source address, and forwarding the data message to the source node.

Further, the method is applied in an architecture network with identification identifier and locator separation, and the first source address is an access identifier of the terminal.

In addition, the embodiment of the present invention further provides a registration method for anonymous communication, which is applied in an architecture nekwork with identification identifier and locator separation, the architecture nekwork at least comprises a first node, an authentication center, a first access node and a first allocation node, wherein, the first node is allocated with an actual identification identifier, and the method comprises:

the first node transmitting an anonymous communication request to the authentication center via the first access node;

the authentication center receiving the anonymous communication request and determining whether the first node has an access to anonymous communication; and in the condition that the first node has an access to anonymous communication, the first access node transmitting an identification identifier allocation request to the first allocation node, and the first allocation node allocating an anonymous identification identifier to the first node and storing a corresponding relationship between the anonymous identification identifier of the first node and the actual identification identifier of the first node, or a corresponding relationship between the anonymous identification identifier of the first node and the actual identification identifier and a location identifier of the first node.

Further, the method further comprises the first allocation node recording that the first node is in an anonymous communication state, and transmitting the anonymous identification identifier to the first access node.

Further, the anonymous identification identifier is selected from a predetermined group of identifiers for the anonymous identification identifier, or is selected from a predetermined group.

The embodiment of the present invention further provides another registration method for anonymous communication, which is applied in an architecture network with identification identifier and locator separation, the architecture network at least comprises a first node, a first access node, and a first storage node, wherein, the first node is allocated with an actual identification identifier, and the method comprises:

the first node transmitting an anonymous communication request to an authentication center via the first access node;

the authentication center receiving the anonymous communication request and determining whether the first node has an access to anonymous communication; and in the condition that the first node has an access to anonymous communication, the first access node allocating an anonymous identification identifier to the first node, and at the same time registering a corresponding relationship between the anonymous identification identifier of the first node and the actual identification identifier of the first node, or a corresponding relationship between the anonymous identification identifier of the first node and the actual identification identifier and a location identifier of the first node, with the first storage node.

Further, the method further comprises the first access node recording that the first node is in an anonymous communication state.

In addition, the embodiment of the present invention further provides a method for transmitting information, comprising:

a first node transmitting information to a second node via a first access node to which the first node belongs, wherein, the information at least comprises a first identifier of the first node and a first identifier of the second node; and after replacing the first identifier of the first node with an updated first identifier of the first node, the first access node to which the first node belongs encapsulating the updated first identifier of the first node and the first identifier of the second node by using the second identifier of the first node and the second identifier of the second node to transmit to a second access node to which the second node belongs, and transmitting the information to the second node after being de-encapsulated by the second access node to which the second node belongs.

Further, the first identifier is an identification identifier, the second identifier is a location identifier, the updated first identifier of the first node and/or the second identifier of the first node and the second identifier of the second node are obtained locally by the first access node, or are obtained by another node except the first access node.

Further, the method further comprises a step of determining whether the transmitting of the information triggers a replacing process when the first access node receives the information.

The embodiment of the present invention further provides a system for receiving and transmitting information, which is applied in an architecture network with identification and locator separation, comprising:

a receiving unit, used to receive information transmitted by a first node to a second node, wherein, the information at least comprises identification identifiers of the first node and the second node;

an updating unit, used to update the identification identifier of the first node to be an anonymous identification identifier; and an encapsulating unit, used to encapsulate location identifiers of the first node and the second node outside the anonymous identification identifier and the identification identifier of the second node, for the architecture network with identification and locator separation architecture network to implement routing and forwarding, so as to transmit the information to the second node; and wherein the receiving unit is further used to update the anonymous identification identifier to be the identification identifier of the first node when receiving the information transmitted by the second node to the first node, and forward the information to the first node.

The embodiment of the present invention further provides another system for receiving and transmitting information, which is applied in an architecture network with identification an locator separation, said system comprises a first system and a second system, wherein, the first system comprises:

a first receiving and transmitting unit, used to receive first information transmitted by a first node to a second node, wherein, the first information comprises identification identifiers of the first node and the second node; and used to receive second information transmitted by a second receiving and transmitting unit of the second system, wherein, the second information comprises an anonymous identification identifier of the first node and an identification identifier of the second node; and a first replacing unit, used to update the identification identifier of the first node to be an anonymous identification identifier when the first node transmits the first information to the second node; and used to update the anonymous identification identifier to be the identification identifier of the first node when the second node transmits the second information to the first node;

the second system comprises:

the second receiving and transmitting unit, used to receive the first information and forward the first information to the first node; and used to forward the second information from the second node to the first node, wherein, the second information comprises the anonymous identification identifier of the first node and the identification identifier of the second node.

Further, the anonymous identification identifier of the first node is used to identify a transmitting party of the information and the identification identifier of the second node is used to identify a receiving party of the information when the first node transmits the first information to the second node, and the anonymous identification identifier of the first node is used to identify a receiving party of the information and the identification identifier of the second node is used to identify a transmitting party of the information when the second node transmits the second information to the first node.

A person having ordinary skill in the art can understand that all or part of steps in the above method can be implemented by programs instructing related hardware, and the programs can be stored in a computer readable storage medium, such as a read-only memory, disk or CD-ROM etc. Alternatively, all or part of steps in the above embodiments can also be implemented by one or more integrated circuits. Accordingly, each module/unit in the above embodiments can be implemented in a form of hardware, and can also be implemented in a form of software functional module. The present invention is not limited to any particular form of a combination of hardware and software.

INDUSTRIAL APPLICABILITY

A solution for anonymous communication under the architecture with ID identifier and locator separation is provided in the present invention, which can provide an anonymous space on the basis of constructing a real-name trust domain, so as to meet the requirements for the development of anonymous services. Under the architecture with ID identifier and locator separation, the real-name trust domain is ensured by the network credit, and in the anonymous space, the services are developed by the network according to service authentication.

What is claimed is:

1. A method for anonymous communication, comprising:
after receiving an anonymous communication request initiated by a terminal, a network allocating an anonymous identification identifier to the terminal, and recording a state of the terminal as an anonymous communication state;
when the terminal is in the anonymous communication state, an access gateway device where the terminal is located replacing a source access identifier in a first data message with the anonymous identification identifier responsive to receiving the first data message that has been transmitted from the terminal, and replacing the anonymous identification identifier in a second data message with the source access identifier of the terminal responsive to receiving the second data message that is being transmitted to the terminal;
wherein the method is applied in an identification identifier and locator separation network, the identification identifier and locator separation network is divided into an access network and a backbone network, the access network is located at edge of the backbone network and is responsible for accessing of the terminal, the backbone network is responsible for routing of the terminal, the access gateway device is located at a boundary point of the backbone network and the access network and interfaces with the access network and the backbone network; and
the source access identifier is used in the access network and always remains the same when the terminal moves, and the anonymous identification identifier is a new access identifier which is used in the backbone network;

wherein before the step of recording a state of the terminal as an anonymous communication state, the method further comprises:
when receiving the anonymous communication request, the access gateway device where the terminal is located initiating an authentication process to an authentication center, and recording the state of the terminal as the anonymous communication state after acknowledging that the terminal has access to an anonymous communication service; and the method further comprising:
after receiving a request for canceling the anonymous communication from the terminal, the access gateway device where the terminal is located changing the state of the terminal from the anonymous communication state to a normal communication state.

2. The method according to claim 1, wherein
in the step of allocating an anonymous identification identifier to the terminal, a mapping server in the network or the access gateway device where the terminal is located allocating the anonymous identification identifier to the terminal.

3. The method according to claim 2, wherein the step of the access gateway device where the terminal is located allocating the anonymous identification identifier to the terminal further comprises:
registering the allocated anonymous identification identifier with the mapping server.

4. The method according to claim 1, further comprising:
after changing the state of the terminal from the anonymous communication state to a normal communication state, the access gateway device where the terminal is located canceling the replacement of the anonymous identification identifier when receiving/transmitting the first or second data message from/to the terminal.

5. The method according to claim 1, wherein
the anonymous communication request initiated by the terminal carries time period information; and
the step of the access gateway device where the terminal is located recording the state of the terminal as an anonymous communication state when receiving the anonymous communication request further comprises:
setting an anonymous communication timer according to the time period information in the anonymous communication request; and changing the state of the terminal from the anonymous communication state to the normal communication state after a timing period of the anonymous communication timer is expired.

6. A method for forwarding one or more data messages, comprising:
a source node device transmitting a data message to a destination node device, wherein the data message comprises a destination address and an access identifier of the source node device;
when the source node device is in the anonymous communication state, a source access node device receiving the data message and replacing the access identifier of the source node device contained in the data message with an anonymous identification identifier allocated to the source node device, and forwarding the data message to a destination access node device according to the destination address; and
after receiving the data message, the destination access node device forwarding the data message to the destination node device;
wherein the method is applied in an identification identifier and locator separation network, the identification identifier and locator separation network is divided into an access network and a backbone network, the access network is located at the edge of the backbone network and is responsible for the access of the source node device, the backbone network is responsible for the routing of the source node device, the source access node device and the destination access node device are located at a boundary point of the backbone network and the access network and interface with the access network and the backbone network; and the access identifier is used in the access network and always remains the same when the source node device moves, and the anonymous identification identifier is a new access identifier which is used in the backbone network;
wherein before recording a state of the terminal as an anonymous communication state, when receiving the anonymous communication request, the source access node device where the terminal is located initiating an authentication process to an authentication center, and recording the state of the terminal as the anonymous communication state after acknowledging that the terminal has access to an anonymous communication service; and
after receiving a request for canceling the anonymous communication from the terminal, the source access node device where the terminal is located changing the state of the terminal from the anonymous communication state to a normal communication state.

7. The method according to claim 6, further comprising,
after receiving the data message, the destination node device responding with a response data message to the source node device with the anonymous identification identifier being a destination address;
the destination access node device forwarding the response data message to the source access node device according to the anonymous identification identifier; and
after receiving the response data message, the source node device replacing the anonymous identification identifier contained in the response data message with the corresponding access identifier to forward to the source node device.

8. A registration method for anonymous communication, comprising:
a first node device, which is allocated with a source access identifier, transmitting an anonymous communication request to an authentication center via a first access node device;
the authentication center receiving the anonymous communication request and determining whether the first node device has access to anonymous communication; and
if it is determined that the first node device has access to anonymous communication, the first access node device transmitting an anonymous communication request to a node device, and the node device allocating an anonymous identification identifier to the first node device and storing (a) a corresponding relationship between the anonymous identification identifier of the first node device and the source access identifier of the first node device, or (b) a corresponding relationship between the anonymous identification identifier of the first node device and the source access identifier and a location identifier of the first node device;
wherein the method is applied in an identification identifier and locator separation network, the identification identifier and locator separation network is divided into an access network and a backbone network, the access network is located at the edge of the backbone network and is responsible for the access of the first node device, the backbone network is responsible for the routing of the first node device, the first access node device is located at a boundary point of the backbone network and the access network and interfaces with the access network and the backbone network; and the source access identifier is used in the access network and always remains the same when the first node device moves, and the anonymous identification identifier is a new access identifier which is used in the backbone network;

wherein before recording a state of the terminal as an anonymous communication state, when receiving the anonymous communication request, the source access node device where the terminal is located initiating an authentication process to an authentication center, and recording the state of the terminal as the anonymous communication state after acknowledging that the terminal has access to an anonymous communication service; and after receiving a request for canceling the anonymous communication from the terminal, the source access node device where the terminal is located changing the state of the terminal from the anonymous communication state to a normal communication state.

9. The registration method according to claim 8, further comprising:

the node device used to allocate the anonymous identification identifier recording that the first node device is in an anonymous communication state, and transmitting the anonymous identification identifier to the first access node device.

10. The registration method according to claim 9, wherein the anonymous communication request comprises time period information, and wherein the registration method further comprises:

when receiving the anonymous communication request, the first access node device setting an anonymous communication timer according to the time period information; and changing the state of the first node device from the anonymous communication state to a normal communication state after a timing period of the anonymous communication timer has expired.

11. The method according to claim 8, wherein the anonymous identification identifier is selected from a predetermined group of identifiers for the anonymous identification identifier, or is selected from a predetermined group.

* * * * *